United States Patent
Mutilangi et al.

(10) Patent No.: US 11,944,111 B2
(45) Date of Patent: Apr. 2, 2024

(54) STABILIZING SORBIC ACID IN BEVERAGE SYRUP

(71) Applicant: PepsiCo, Inc., Purchase, NY (US)

(72) Inventors: William Mutilangi, Peekskill, NY (US); Naijie Zhang, Ridgefield, CT (US)

(73) Assignee: PepsiCo., Inc., Purchase, NY (US)

( * ) Notice: Subject to any disclaimer, the term of this patent is extended or adjusted under 35 U.S.C. 154(b) by 399 days.

(21) Appl. No.: 14/627,075

(22) Filed: Feb. 20, 2015

(65) Prior Publication Data

US 2016/0242452 A1     Aug. 25, 2016

(51) Int. Cl.
| A23L 2/44 | (2006.01) |
| A01N 37/06 | (2006.01) |
| A23L 2/385 | (2006.01) |
| A23L 2/52 | (2006.01) |

(52) U.S. Cl.
CPC .............. *A23L 2/44* (2013.01); *A01N 37/06* (2013.01); *A23L 2/385* (2013.01); *A23L 2/52* (2013.01)

(58) Field of Classification Search
CPC ... A23L 2/44; A23L 2/52; A23L 2/385; A23L 2/39; A01N 37/06
See application file for complete search history.

(56) References Cited

U.S. PATENT DOCUMENTS

| 3,021,219 | A |   | 2/1962  | Melnick |           |
| 4,399,150 | A |   | 8/1983  | Ueno et al. |       |
| 4,784,878 | A | * | 11/1988 | Haak ...................... | A23C 1/045 |
|           |   |   |         |         | 118/313   |
| 4,786,521 | A |   | 11/1988 | Bennett et al. |    |
| 5,714,168 | A |   | 2/1998  | Stroh et al. |      |
| 5,792,502 | A | * | 8/1998  | Montezinos ............ | A23F 3/163 |
|           |   |   |         |         | 426/573   |
| 5,888,569 | A |   | 3/1999  | Jager et al. |      |
| 6,126,980 | A |   | 10/2000 | Smith et al. |      |
| 6,512,142 | B1 |  | 1/2003  | Kouno et al. |      |
| 2004/0086619 | A1 | | 5/2004 | Zhong et al. |      |
| 2005/0053704 | A1 | | 3/2005 | Kemp et al. |       |
| 2005/0153020 | A1 | | 7/2005 | Hamre et al. |      |
| 2007/0054026 | A1 | | 3/2007 | Grenville et al. |  |
| 2007/0141203 | A1 | | 6/2007 | Cook |              |
| 2007/0275140 | A1 | | 11/2007 | Safko |            |
| 2009/0074926 | A1 | | 3/2009 | Roel et al. |       |
| 2009/0306210 | A1 | | 12/2009 | Behnam |           |
| 2012/0219681 | A1 | * | 8/2012 | Given ...................... | A23L 2/44 |
|           |   |   |         |         | 426/330.3 |
| 2013/0251881 | A1 | * | 9/2013 | Mutilangi ................ | A23L 2/60 |
|           |   |   |         |         | 426/590   |
| 2014/0212564 | A1 | | 7/2014 | Zhang et al. |      |
| 2015/0017284 | A1 | * | 1/2015 | Prakash .................... | A23L 2/60 |
|           |   |   |         |         | 426/654   |

FOREIGN PATENT DOCUMENTS

| CA | 2827889 A1 * | 11/2012 | ............... A23L 2/44 |
| CN | 101243895 A | 8/2008 | |
| CN | 101810361 A | 8/2010 | |
| DE | 2623682 A1 | 12/1976 | |
| JP | H09-047252 | 2/1997 | |
| JP | 2001-031507 | 2/2001 | |
| JP | 2001-039922 | 2/2001 | |
| JP | 2013066458 A | 4/2013 | |
| WO | WO-1996-26648 | 9/1996 | |
| WO | 199721359 A1 | 6/1997 | |
| WO | WO-1999-21431 A1 | 5/1999 | |
| WO | 2002/043509 A1 | 6/2002 | |
| WO | 2006029896 A1 | 3/2006 | |
| WO | WO-2010-017050 A1 | 2/2010 | |
| WO | WO-2012-154245 A1 | 11/2012 | |
| WO | WO-2013-135759 | 9/2013 | |
| WO | WO 2014120506 A2 | 8/2014 | |
| WO | WO-2014-208613 A1 | 12/2014 | |

OTHER PUBLICATIONS

Stopforth, J.D. et al., Sorbic Acid and Sorbates in Antimicrobials in Food, Davidson PM; Stofos, JN branen, AL.ed. Taylor & Francis Inc., pp. 49-90, dated 2005.

Database WPI Week 201063, Thomson Scientific AN 2010-L68981, XP002676321, dated Aug. 25, 2010.

Maurice Schachman Chapter 9, Syrup Making—The Heart of the Process in the Soft Drinks Companion: A Technical Handbook for the Beverage Industry; CRC Press 2004 http://www.crcnetbase.com/doi/pdf/10.1201/9780203492123.ch9; accessed on May 10, 2012.

Ashurst, Philip R., Non-carbonated beverages, In Chemistry and Technology of Soft Drinks and Fruit Juices, Second Edition Edited by Philip R. Ashurst Copyright 2005 by Blackwell Publishing Ltd., pp. 129-149.

International Application No. PCT/US2016/018424, Filed Feb. 18, 2016, International Search Report and the Written Opinion of the international Searching Authority, or the Declaration, dated Apr. 29, 2016, 12 pages.

Peng, S. et al "Investigation of the solubility enhancement mechanism of rebaudioside D using a solid dispersion technique with potassium sorbate as a carrier," *Food Chemistry*, 174: 564-570 (2015).

* cited by examiner

*Primary Examiner* — Nikki H. Dees
(74) *Attorney, Agent, or Firm* — Sterne, Kessler, Goldstein & Fox P.L.L.C.

(57) ABSTRACT

A method for preparing a sorbate powder comprising dissolving sorbate salt in water, adding a stabilizing carrier to the sorbate solution, and spray drying the sorbate solution to form the sorbate powder. The sorbate powder is stable in beverage syrup.

9 Claims, No Drawings

STABILIZING SORBIC ACID IN BEVERAGE SYRUP

FIELD OF THE INVENTION

The invention relates to a method for stabilizing sorbic acid in beverages and beverage syrup. In particular, the method relates to stabilizing sorbic acid in fountain beverage syrups.

BACKGROUND OF THE INVENTION

Consumer demand for refreshing beverages has led to introduction of many types of beverages. Commercial distribution of beverages requires that the beverages, and syrup from which beverages are made, be protected from spoilage if not consumed or used upon manufacture.

Beverages can be maintained under conditions that significantly retard activity of microbial and other spoilage agents, such as bacteria, molds, and fungi. Such conditions often require, for example, refrigeration until the beverage or syrup is consumed. Maintenance of such conditions often is not possible or practical.

Another method of retarding microbial activity is to add preservatives to the beverage. Many preservatives are known. However, known preservatives typically have disadvantages that limit use in beverages. For example, preservatives may impart off taste to the beverage when used in a concentration sufficient to provide preservative effect. Preservatives also may adversely affect the appearance of the beverage.

Some preservatives precipitate or form crystals or a floc under conditions of manufacture or storage of a beverage or of a syrup from which a beverage is made. Some preservatives may cloud the beverage, which is unacceptable to the consumer if the beverage is expected to be clear. Such phenomena typically are unacceptable to consumers not only because of certain preconceptions relating to appearance, but also because consumers often equate cloud or particulate formation with spoilage of the beverage. Floc, crystals, or sediment or sediment-like deposits in a beverage bottle also are unacceptable to consumers because the solids typically taste bad and present an unpleasant mouthfeel (for example, a gritty or sandy mouthfeel).

Beverages often are made from concentrates that are diluted. Beverages then are provided immediately to a consumer, or are packaged for distribution and consumption. The concentrates, often called syrups, are conveniently shipped, and then used to make beverages in a one-step process. Thus, it is convenient to put all ingredients, including preservatives, into syrup. However, because syrup is concentrated, it often is not possible to introduce compounds that have limited solubility without precipitation.

Sorbic acid is widely used as a preservative in foods and beverages. A common problem of using Sorbic acid in beverages is its low solubility. The solubility of sorbic acid in high acid syrup is low, e.g., 0.08% in 60% brix syrup. Typically, sorbic acid level in syrup is in the range of 0.08%-0.2% depending on Sugar level. The solubility of Sorbic acid is dependent on temperature. Solubility decreases as temperature decreases. Because of low solubility, sorbic acid is unstable in syrup resulting in precipitation. In prior art beverages and syrups, the concentration of sorbic acid in a beverage typically is less than 500 ppm and the concentration of sorbic acid in syrup typically is less than 1300 ppm.

U.S. Pat. Nos. 8,697,163, 8,691,309, 8,563,062, and 8,414,942 and US 2012/0219679 address different methods for stabilizing, and reducing precipitation of, sorbic acid in syrup and beverages. Sorbic acid aqueous dispersions are generally stable in normal syrup for 24-72 hours.

However, sorbic acid aqueous dispersions have a limited stability and therefore are generally not utilized in fountain syrups which require 6 months stability. In addition, the process of forming the aqueous dispersion requires high shear mixing and/or homogenization. However, due to the poor solubility, the resulting aqueous dispersion has a low concentration of sorbic acid. Therefore, it is desirable to develop a process that includes a simple step for stabilizing sorbic acid in normal syrup and fountain syrup.

BRIEF SUMMARY OF THE INVENTION

Aspects of the invention are directed to a method for stabilizing sorbic acid in beverage syrup including fountain syrup.

In one aspect, the sorbic acid is stabilized with a carrier using solid-dispersion technology.

In another aspect, the sorbic acid is spray dried to form small particles comprising sorbic acid and a carrier.

In a further aspect, the sorbic acid/carrier is added to beverage syrup.

DETAILED DESCRIPTION OF THE INVENTION

As used herein, "syrup" or "beverage syrup" is a beverage precursor to which a fluid, typically water, is added to form a ready-to-drink beverage, or a "beverage." Typically, the volumetric ratio of syrup to water is between 1:3 to 1:8, more typically between 1:4 and 1:5. The volumetric ratio of syrup to water also is expressed as a "throw." A 1:5 ratio, which is a ratio commonly used within the beverage industry, is known as a "1+5 throw."

As used herein, "beverage" refers to beverages such as soft drinks, fountain beverages, frozen ready-to-drink beverages, coffee beverages, tea beverages, sport drinks, and alcoholic products. The beverage may be carbonated or noncarbonated. In addition, in certain embodiments of the invention, "beverage" refers also to juice, dairy, and other non-clear beverages. Beverages according to embodiments of the invention can be clear or non-clear. Fountain drinks refer to drinks prepared by combining flavored syrup or syrup concentrate and carbonated water when the drink is dispensed for immediate consumption.

"Clear" refers to optical clarity, i.e., a clear beverage can be as clear as water. In a preferred embodiment of the present invention, the beverage concentrate and/or the finished beverage are clear as evidenced by a reading by a HACH Turbidimeter (Model 2100AN, Hach Company, Loveland, Colo.). Readings of up to 3 NTU (Nephelometric Turbidity Units) are considered very clear, and values up to 5 NTU can be considered clear. When such a reading is as high as around 6 to 10 NTU, a sample is not clear, but rather very slightly hazy or slightly hazy. At 15 NTU, a beverage is hazy. Thus, a beverage having turbidity not greater than 5 NTU is said to be a clear beverage, with values of 6 NTU being very slightly hazy to slightly hazy at 10 NTU.

As used herein, "stable" beverage syrup refers to syrup in which no phase separation occurs, i.e., no crystal, floc, sediment, or precipitation at room temperature and low temperature (<50° F.) over a period of more than three days, typically more than one week, more typically more than four weeks, more typically more than ten weeks, and most typically more than twenty weeks. As used herein, a "stable" finished beverage refers to a clear beverage in which no phase separation occurs, i.e., no crystal, floc, sediment, or precipitation at room temperature at 40° F., 70° F., 90° F., and 110° F. over a period of four weeks, typically more than ten weeks, more typically for a period of more than twenty weeks, and more typically more than six months, i.e., within the typical shelf-life of the finished beverage. For fountain-based syrups, at least six months shelf stability is desired.

A "preserved" beverage shows no significant microbiological activity during the period of stability.

As typically used herein, "water" is water, typically conditioned and treated, of a quality suitable for manufacturing beverages. Excessive hardness may induce precipitation of sorbic acid. With the guidance provided herein, the skilled practitioner will be able to provide water of sufficient quality.

"Fluid" means water and juice, dairy, or other liquid beverage products that form part of beverages. For example, dairy components may be added in quantity that does not provide sufficient hardness to induce sorbic acid precipitation. With the guidance provided herein, the skilled practitioner can determine whether addition of dairy, juice or other liquid beverage product is suitable for use in embodiments of the invention.

For brevity, the invention will be described as it relates to water as the fluid. However, the description herein also relates to fluid, as defined herein. With the guidance provided herein, the skilled practitioner will be able to provide fluids suitable for use in forming syrup.

Beverages and syrups made in accordance with embodiments of the invention typically comprise water, preservative (including sorbic acid), sweetener, pH-neutral compounds, acids and acidic compounds, and flavors and flavor compounds. These compounds typically include taste modifiers, nutrients, colors, and other compounds, such as emulsions, surfactants, buffers, and anti-foaming compounds, typically found in beverages.

Sorbic acid and sorbates act as preservatives. However, at the pH levels typically found in syrups, and at a typical sorbic acid and/or sorbate concentrations in syrup sufficient to provide commercially useful preservative activity in beverages made therefrom, sorbic acid is likely to precipitate unless steps are taken to avoid precipitation. Sorbic acid precipitation is particularly a problem for fountain syrups which require long term storage.

It was discovered that precipitation of sorbic acid in syrup during manufacture of the syrup and the beverage can be avoided by dispersing sorbate or sorbate/sorbic acid particles into an inert hydrophilic solid carrier matrix using a spray drying process (solid dispersion). The resulting particles may then be added to syrup or beverage compositions.

A sorbate solid dispersion is prepared by first dissolving a sorbate in water. The temperature of the water may be from 20 to 99° C., more typically 20 to 40° C. or 20 to 30° C., but most typically around room temperature or 20 to 25° C. The amount of sorbate dissolved is generally to achieve a concentration in the range of at 1-60% (w/w), more typically 10-20% (w/w).

The sorbate may be any suitable sorbate such as potassium sorbate or sodium sorbate. In particular aspects, potassium sorbate is utilized.

Then, at least one stabilizing carrier is added to the solution and the solution mixed at 20-99° C., generally for at least 10 minutes, typically 20 to 30 minutes, for example 30 minutes. The pH may not be adjusted or may be adjusted to maintain a pH of 4 to 10 depending on the type of carrier being used. The solution will comprise sorbate or a mixture of sorbate and sorbic acid depending on the pH. Thus adjusting the pH may affect the ratio of sorbate to sorbic acid. Low pH favors higher amounts of sorbic acid whereas higher pH favors low or no sorbic acid present.

The pH may be adjusted by addition of a suitable acid or base such as, but not limited to phosphoric acid, citric acid, or sodium hydroxide.

Potential stabilizing carriers are oxygenated, hydrophilic salts of organic, inorganic acids, and steviol glycosides such as potassium dihydrogen phosphate ($KH_2PO_4$), citrates such as potassium citrate, tartrates such as sodium tartrate, and sodium hexametaphosphate (SHMP); polysaccharides including maltodextrin, gum arabic, pectin, carrageenan, ghatti gum, starch, alginate, cellulose, modified starch, carboxyl methyl cellulose (CMC); steviol glycosides including rebaudioside A, rebaudioside D or combination thereof. The carrier is preferably not pretreated but instead is used as is.

The ratio of the stabilizing carrier to sorbate ranges from 0.1:10 to 10:0.1, 0.5:5 to 5:0.5, 0.5:2 to 2:0.5. More typically, the range will be 1 to 1.

The sorbate-carrier solution is then spray dried to yield fine sorbate solid dispersion powder. Spray drying may be achieved with 200° C. dry temperature and 10 ml/min flow rate. The particle size of the powder may be 1 to 500 microns, preferably 10 to 300 microns. The sorbate solid dispersion powder typically contains 20 to 80 wt % or 30 to 70 wt %, or 35 to 65 wt %, sorbate based on total weight of the powder. The sorbate powder is shelf stable.

In prior art beverages and syrups, the concentration of sorbic acid in a beverage typically is less than 500 ppm and the concentration of sorbic acid in syrup typically is less than 1300 ppm. In aqueous solution at pH of between 2.5 and 4 at about 20° C., which are typical manufacturing conditions for beverages and syrups, sorbic acid precipitation begins at sorbate concentration of about 500 ppm, unless steps are taken to preclude precipitation, and at 1300 ppm, the tendency to precipitate is clear.

In contrast, the sorbate solid dispersion powder in accordance with aspects of the invention may be added to water in an amount up to 2300 ppm depending on whether the solution is intended to be syrup (concentrate). The sorbate solid dispersion powder dissolves in water rapidly with minimal agitation. In aspects of the invention, concentrations for fountain syrup are 1000 to 2300 ppm, more typically 1000 to 1500 ppm. The dispersion is stable at 1000 to 2300 ppm sorbate (w/v) in various fountain syrups such as teas, lemonades, fruit punches, and carbonated beverages such as colas and citrus flavored syrups.

Fountain syrups prepared with the sorbate solid dispersion powder does not suffer sorbic acid shock out (precipitation) for at least month at 40° F. However, fountain syrups prepared with untreated sorbate has shock out under the same conditions and same level within 7-20 days.

Although not wishing to be bound by any theory, the enhanced solubility and stability achieved by the sorbate solid dispersion powder may be attributed to the formation of a complex between sorbate/sorbic acid and the stabilizing carrier through non-covalent bonding such as hydrogen bonding. In fountain syrups, the stabilizing carrier associated with the sorbate/sorbic acid can prevent sorbic acid from crystallizing resulting in increased physical stability.

The relative solubility of sorbic acid in solid dispersion was determined by UV-Vis spectrometer. The potassium sorbate was first dissolved in water at 0.25-0.5% (w/w) concentration at room temperature. The sorbate solution was acidified by adding citric acid at pH 2.5-3.0 resulting in sorbic acid precipitation. The precipitated sorbic acid was removed by centrifugation and the saturated solution was stored at 40° F. The relative concentration of sorbic acid was measured by UV-vis at λmax=263 nm. The results showed that the absorption intensity of sorbic acid with carrier in solid dispersion is higher than that of sorbate control without carrier (Table 2). According to the Lambert-Beer Law, the concentration of sorbic acid is proportional to absorption intensity ($Abs_{(Intesity)}$=K [Sorbic Acid]). Therefore, the higher absorption intensity, the higher solubility the sorbic acid has.

The carrier type affects the solubility and stability of sorbic acid in syrup and beverage. Sorbate with sodium hexametaphosphate (SHMP), in particular, as a carrier exhibits high stability in buffer solution at low pH. Sorbate/SHMP solid dispersion is stable at pH 2.5-3.0 buffer solution. There is no crystallization observed after acidified sorbate solution at room temperature or after stored saturated solution at 40° F. for 14 days compared to other carriers. Increasing stability may be attributed to its smaller particle size and higher negative zeta potential. Since phosphoric acid is a strong acid with low pKa, the sorbic acid absorbed phosphoric acid particles in aqueous solution carry high negative charges even at low pH. That is, the zeta potential and particle size appear to play important roles in stabilizing sorbic acid in syrup. The higher negative zeta potential, the higher stability sorbic acid/SHMP has. According to the colloidal stability of DVLO theory, the stability of the particles in solution is dependent upon its total potential energies (Van Der Waals attraction, electrostatic repulsion, and steric repulsion). Among the total potential energies, electrostatic repulsion which is highly dependent on zeta potential dominates the particle stability. Therefore, sorbic acid/SHMP particles having high negative surface charge are stabilized by electrostatic repulsion in syrup and beverage.

Therefore, addition of sorbate in accordance with aspects of the invention is contemplated at a wide range of sorbic acid concentrations while essentially precluding sorbic acid precipitation.

As the skilled practitioner recognizes, other compounds in the beverage or syrup may also affect sorbic acid solubility adversely. For example, hardness lowers the solubility of sorbic acid. The concentration of sorbic acid required to achieve commercial preservation conditions also relates to other conditions of the syrup or beverage. For example, carbonation will decrease the concentration of sorbic acid required to achieve a given preservation performance. In contradistinction, lowering the pH lowers the concentration of sorbic acid required to achieve a given preservation performance. With the guidance provided herein, the skilled practitioner will be able to establish a sorbic acid concentration that suitably preserves a syrup or beverage.

In accordance with aspects of the invention, syrup and beverages include sorbic acid as preservative. Other preservatives are known to the skilled practitioner, and may be included with the sorbic acid. Other preservatives include, for example, chelators such as the EDTA's, including disodium EDTA, calcium disodium EDTA, and sodium hexametaphosphate (SHMP), and antimicrobials such as benzoates, particularly the alkali metal benzoates; lauric arginate; salts of cinnamic acid; and antioxidants, including tocopherols, BHA, and BHT. In accordance with embodiments of the invention, other preservatives are used sparingly, and most typically not at all. With the guidance provided herein, the skilled practitioner will be able to select appropriate preservatives.

Sweeteners of beverage and syrup embodiments of the invention include caloric carbohydrate sweeteners, natural high-potency sweeteners, synthetic high-potency sweeteners, other sweeteners, and combinations thereof. With the guidance provided herein, a suitable sweetening system (whether a single compound or combination thereof) can be selected.

Examples of suitable caloric carbohydrate sweeteners include sucrose, fructose, glucose, erythritol, maltitol, lactitol, sorbitol, mannitol, xylitol, D-tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, nigero-oligosaccharides, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, and glucose syrup.

Other sweeteners suitable for use in embodiments provided herein include natural, synthetic, and other high-potency sweeteners. As used herein, the phrases "natural high-potency sweetener," "NHPS," "NHPS composition," and "natural high-potency sweetener composition" are synonymous. "NHPS" means any sweetener found in nature which may be in raw, extracted, purified, treated enzymatically, or any other form, singularly or in combination thereof and characteristically has a sweetness potency greater than sucrose, fructose, or glucose, yet has fewer calories. Non-limiting examples of NHPS's suitable for embodiments of this invention include rebaudioside A, rebaudioside B, rebaudioside C (dulcoside B), rebaudioside D, rebaudioside E, rebaudioside F, dulcoside A, rubusoside, stevia, stevioside, mogroside IV, mogroside V, Luo Han Guo sweetener, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobtain, baiyunoside, osladin, polypodoside A, pterocaryoside A, pterocaryoside B, mukurozioside, phlomisoside I, periandrin I, abrusoside A, and cyclocarioside I.

NHPS also includes modified NHPS's. Modified NHPS's include NHPS's which have been altered naturally. For example, a modified NHPS includes, but is not limited to, NHPS's which have been fermented, contacted with enzyme, or derivatized or substituted on the NHPS. In one embodiment, at least one modified NHPS may be used in combination with at least one NHPS. In another embodiment, at least one modified NHPS may be used without a NHPS. Thus, modified NHPS's may be substituted for a NHPS or may be used in combination with NHPS's for any of the embodiments described herein. For the sake of brevity, however, in the description of embodiments of this invention, a modified NHPS is not expressly described as an alternative to an unmodified NHPS, but it should be understood that modified NHPS's can be substituted for NHPS's in any embodiment disclosed herein.

As used herein, the phrase "synthetic sweetener" refers to any composition that is not found in nature and is a high potency sweetener. Non-limiting examples of synthetic sweeteners, which also are known as 'artificial sweeteners,' suitable for embodiments of this invention include sucralose, acesulfame potassium (acesulfame K or aceK) or other salts, aspartame, alitame, saccharin, neohesperidin dihydrochalcone, cyclamate, neotame, N-[3-(3-hydroxy-4-methoxyphenyl)propyl]-L-α-aspartyl]-L-phenylalanine 1-methyl ester, N-[3-(3-hydroxy-4-methoxyphenyl)-3-methylbutyl]-L-α-aspartyl]-L-phenylalanine 1-methyl ester, N-[3-(3-methoxy-4-hydroxyphenyl)propyl]-L-α-aspartyl]-L-phenylalanine 1-methyl ester, and salts thereof.

Acids suitably used in embodiments of the invention include food grade acids typically used in beverages and beverage syrups. Buffers include salts of food grade acids that form pH buffers, i.e., provide a combination of compounds that tends to maintain the pH at a selected level. Food acids for use in particular embodiments include, but are not limited to, phosphoric acid, citric acid, ascorbic acid, adipic acid, fumaric acid, lactic acid, malic acid, tartaric acid, acetic acid, oxalic acid, tannic acid, caffeotannic acid, and combinations thereof.

Flavors routinely used in beverages and syrups are suitably used in beverages and syrups that are embodiment of the invention. The skilled practitioner recognizes that some flavors will haze or add a cloudy appearance to a beverage. Therefore, such a flavor, which often may be an emulsion, would not be suitably used in a clear beverage. Suitable flavors include flavors typically used in beverages and syrup that are not incompatible with the type of beverage. That is, a clear beverage would not typically be flavored with a flavor that would cloud the beverage, introduce haze, or otherwise make the beverage less attractive to the consumer. However, subject to this condition known to the skilled practitioner, known flavors suitably are used, as appropriate.

Any flavor, flavor compound, or flavor system consistent with the type of beverage suitably is used in embodiments of the invention. Further, the flavor may be in any form, such as powder, emulsion, micro-emulsion, and the like. Some of these forms may induce clouding in a beverage, and so would not be used in a clear beverage. Typical flavors include almond, amaretto, apple, sour apple, apricot, nectarine, banana, black cherry, cherry, raspberry, black raspberry, blueberry, chocolate, cinnamon, coconut, coffee, cola, cranberry, cream, irish cream, fruit punch, ginger, grand marnier, grape, grapefruit, guava, grenadine, pomegranate, hazelnut, kiwi, lemon, lime, lemon/lime, tangerine, mandarin, mango, mocha, orange, papaya, passion fruit, peach, pear, peppermint, spearmint, pina colada, pineapple, root beer, birch beer, sarsaparilla, strawberry, boysenberry, tea, tonic, watermelon, melon, wild cherry, and vanilla. Exemplary flavors are lemon-lime, cola, coffee, tea, fruit flavors of all types, and combinations thereof.

Surfactants other than polysorbate also may be present in the syrup or beverage may be added as an ingredient of the syrup. The skilled practitioner recognizes that surfactant also may be introduced into the syrup or beverage as part of a component ingredient. Surfactants typically suitable for use in embodiments of this invention include, but are not limited to, sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltrimethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other surfactants.

The skilled practitioner recognizes that ingredients can be added singularly or in combination. Also, solutions of dry ingredients can be made and used to conveniently add ingredients to the bulk quantity of water.

The skilled practitioner recognizes that, if a temperature higher than ambient temperature is used during syrup manufacture, the temperature of the syrup may be reduced after the product is complete, or, typically, after acidification and before volatile materials are added. Typically, beverage syrup is made by adding ingredients to a bulk quantity of water. The water typically is at a temperature of at least 50° F. and typically less than 200° F., commonly between 50° F. and 160° F., and typically between 50° F. and 130° F.

Ingredients typically are added to the bulk quantity of water in an order that minimizes potential adverse interactions between ingredients or potential adverse effect on an ingredient. For example, nutrients that are temperature-sensitive might be added during a relatively low-temperature portion toward the end of the manufacturing process. Similarly, flavors and flavor compounds often are added just before completion of the syrup to minimize potential loss of volatile components and to minimize flavor loss in any form. Often, acidification is one of the last steps, typically carried out before temperature-sensitive, volatile, and flavor materials are added. Thus, flavors or flavor components or other volatile materials and nutrients typically are added at an appropriate time and at an appropriate temperature. With the guidance provided herein, the skilled practitioner can identify an appropriate time to introduce flavor and other volatile materials.

Any of these or other orders of ingredient addition are suitably used, as the order in which ingredients are added can be determined by the skilled practitioner with the guidance provided herein.

The resulting syrup is packaged and may be stored. Syrup may be used essentially immediately to manufacture beverages, which typically are packaged for distribution. Syrup also may be distributed to bottlers, who package beverages made by addition of water and perhaps other materials like carbonation. Typically, the throw is 1+5.

A particular aspect of the present invention is the use of the sorbate dispersion powder in fountain drinks. The syrup typically is sold to those who mix the syrup with throw water, and perhaps other ingredients, such as carbonation, for immediate consumption.

Other embodiments of the invention are directed to manufacture of stable preserved ready-to-drink beverages. Such beverages are made by mixing an aliquot of syrup with an appropriate quantity of diluting water. Typically, the ratio of 1 volume of syrup with 5 volumes of water or other fluid, also known as a "1+5 throw", is used.

Syrup embodiments of the invention are stable beverage syrups preserved with sorbic acid having a shelf life of at least three days, or at least about one week at room temperature. More typically, syrup embodiments of the invention have a shelf life of at least four weeks, or at least seven weeks, or at least twenty weeks, and even more typically at least six months.

Beverage embodiments of the invention are stable beverages preserved with sorbic acid having a shelf life of at least four weeks, or at least ten weeks at a temperature between 40° F. and 110° F. More typically, beverage embodiments of the invention have a shelf life of at least four weeks, or at least six weeks, or at least twenty weeks, and even more typically at least six months.

The following are aspects of the invention:

Aspect 1: A method for preparing a sorbate powder comprising dissolving sorbate salt in water, adding a stabilizing carrier to the sorbate solution, and spray drying the carrier-sorbate solution to form the sorbate powder.

Aspect 2: A method of preparing beverage syrup comprising combining water, sorbate powder, and at least one ingredient selected from sweeteners and flavorants, wherein the sorbate-carrier powder is prepared by dissolving sorbate salt in water, adding a stabilizing carrier to the sorbate solution, and spray drying the carrier-sorbate solution to form the sorbate powder.

Aspect 3: A beverage syrup comprising combining water, sorbate powder, and at least one ingredient selected from sweeteners and flavorants, wherein the sorbate-carrier powder is prepared by dissolving sorbate salt in water, adding a stabilizing carrier to the sorbate solution, and spray drying the carrier-sorbate solution to form the sorbate powder. The syrup may comprise 1000 to 2300 ppm sorbate or 1000 to 1500 ppm.

Aspect 4: Any aspect above wherein the sorbate salt is potassium sorbate.

Aspect 5: Any aspect above wherein the carrier is selected from oxygenated, hydrophilic salts of organic and inorganic acids, polysaccharides, steviol glycosides or combinations thereof, for example selected from sodium hexametaphosphate (SHMP), potassium dihydrogen phosphate, potassium citrate, sodium tartrate, maltodextrin, gum arabic, pectin, carrageenan, ghatti gum, starch, alginate, cellulose, modified starch, carboxyl methyl cellulose (CMC), rebaudioside A, rebaudioside D and combinations thereof.

Aspect 6: Any aspect above wherein the pH of the carrier-sorbate solution is 4 to 10.

Aspect 7: Any aspect above further comprising adjusting the pH by addition of an acid or a base, for example by addition of phosphoric acid or sodium hydroxide.

Aspect 8: Any aspect above wherein the ratio of the stabilizing carrier to sorbate ranges from 0.1:10 to 10:0.1, 0.5:5 to 5:0.5, or 1:1.

Aspect 9: Any aspect above wherein the powder comprises 20 to 80 wt %, 30 to 70 wt %, or 35 to 65 wt %, sorbate based on total weight of the powder.

The following examples illustrate, but do not limit, the invention.

Example 1

To a 1000 ml beaker, 15 g potassium sorbate and 500 g water were added. After mixing for 15 minutes at room temperature, the potassium sorbate completely dissolved in the water. The pH of sorbate solution was adjusted from 9.2 to 6.0 by slowly adding phosphoric acid (50%). Then 43 g (35%) gum arabic solution were added. The mixture was mixed for 20 minutes. Subsequently, the sorbate/gum arabic solution was subjected to spray drying resulting in powder containing 50% potassium sorbate. The yield of material recovery is 85%.

Example 2

To a 500 ml beaker, 25 g potassium sorbate and 300 g water were added. After mixing for 15 minutes at room temperature, the potassium sorbate completely dissolved in water with pH 8.85. Then 25 g maltodextrin (DE13-18%) powder was added. The mixture was mixed for 20 minutes. The solution pH dropped from 8.85 to 8.3. Subsequently, the sorbate/maltodextrin solution was subjected to spray drying resulting in powder containing 50% potassium sorbate. The yield of material recovery is 86%.

Example 3

To a 500 ml beaker, 30 g potassium sorbate and 360 g water were added. After mixing for 15 minutes at room temperature, the potassium sorbate completely dissolved in water with pH 9.12. Then 30 g potassium citrate powder was added. The mixture was mixed for 20 minutes. The solution pH was adjusted from 9.2 to 8.45. Subsequently, the sorbate/citrate solution was subjected to spray drying resulting in powder containing 50% potassium sorbate. The yield of material recovery is 80%.

Example 4

To a 500 ml beaker, 15 g potassium monophosphate and 200 g water were added. After mixing for 15 minutes at room temperature, the potassium monophosphate completely dissolved in water with pH 4.3. The pH of potassium monophosphate solution was adjusted from 4.3 to 6.9 by slowly adding 23.22 g sodium hydroxide (3M). Then 15 g potassium sorbate were added. The mixture was mixed for 20 minutes with pH 6.93. Subsequently, the sorbate/potassium monophosphate solution was subjected to spray drying resulting in powder containing 43.38% potassium sorbate. The yield of material recovery is 87%.

Example 5

To a 500 ml beaker, 20 g potassium monophosphate and 200 g water were added. After mixing for 15 minutes at room temperature, the potassium monophosphate completely dissolved in water with pH 4.38. The pH of potassium monophosphate solution was adjusted from 4.48 to 6.76 by slowly adding 20.47 g sodium hydroxide (3M). Then, 20 g potassium sorbate were added. The mixture was mixed for 20 minutes with pH 6.76. Subsequently, the sorbatel potassium monophosphate solution was subjected to spray drying resulting in powder containing 37% potassium sorbate. The yield of material recovery is 85%.

Example 6

To a 500 ml beaker, 20 g potassium sorbate and 360 g water were added. After mixing for 15 minutes at room temperature, the potassium sorbate completely dissolved in water with pH 8.92. The sorbate solution was heated to 45° C. The pH was adjusted to 7.02 by adding 0.45 g phosphoric acid (25%). Then, 30 g maltodextrin (DE13-18%) powder was added. The mixture was mixed for 20 minutes. Subsequently, the sorbate/maltodextrin solution was subjected to spray drying resulting in powder. The yield of material recovery is 87%.

Example 7

To a 500 ml beaker, 28.3 g sodium hexametaphosphate (SHMP) and 150 g water were added. After mixing for 15 minutes at room temperature, the SHMP completely dissolved in water with pH 6.6. The pH of SHMP solution was adjusted 6.8 by adding sodium hydroxide (3M) and then 5 g potassium sorbate added. The mixture was mixed for 20 minutes. Subsequently, the sorbate/SHMP solution was subjected to spray drying resulting in powder. The yield of material recovery is 90%.

TABLE 1

| Example | Product Syrup | Sugar % | pH | Sorbate ppm (w/v) | *Stability |
|---|---|---|---|---|---|
| 3 | Pepsi Twist | 58 | 2.60 | 1175 | stable at 70 F. for at least 48 hr |
| 1, 2, 3, 4, 7 | Trop Lemonade | 39 | 2.85 | 1590 | stable at 40 F. for at least 2 months |
| 5, 6, 8 | Lipton Green Tea Citrus | 36 | 2.53 | 1750 | stable at 70 F. for at least 48 hr |
| 5, 6, 8 | Lipton Lemon | 36 | 2.63 | 1758 | stable at 70 F. for at least 48 hr |
| 4, 7 | Brisk Sweet Tea | 32 | 2.98 | 2070 | stable at 40 F. for at least 2 months |
| 1 | Aquafina Berry | 0 | 2.98 | 1150 | stable at 40 F. for at least 4 months |
| 2, 3, 4, 7 | Diet Pepsi | 0 | 3.80 | 1800 | stable at 40 F. for at least 2 months |
| 3, 4, 7 | LC unsweet tea | 0 | 4.00 | 1950 | stable at 40 F. for at least 2 months |

TABLE 2

| Sample | Aged at 40 F. (day) | Abs (pH 2.5) | Abs (pH 3.0) | Stability |
|---|---|---|---|---|
| Potassium Sorbate | 0 | 1.644 | 1.716 | no crystals |
|  | 7 | 1.357 | 1.24 | lot of crystals |
| 50% K sorbate/ 50% gum arabic | 0 | 2.386 | 2.277 | no crystals |
|  | 7 | 1.567 | 1.628 | some crystals |
| 50% K sorbate/ 50% KH2P04 | 0 | 2.863 | 2.985 | no crystals |
|  | 7 | 1.705 | 1.874 | some crystals |
| 50% K sorbate/ 50% maltodextrin | 0 | 1.952 | 1.962 | no crystals |
|  | 7 | 1.716 | 1.548 | some crystals |

Example 8

To a 250 ml beaker, 108 g potassium sorbate and 110 g water were added. The mixture was heated to 45° C. After mixing for 15 minutes at 45 C, the potassium sorbate was completely dissolved in the water with pH 10.5. The mixture was mixed for 20 minutes. Subsequently, the sorbate solution was subjected to spray drying resulting in powder. The yield of material recovery is 93%.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, other clear beverages are made in embodiments of the invention, and other non-aqueous solvents are used in embodiments of the invention.

We claim:

1. A method of preparing a beverage syrup comprising preparing a sorbate solid dispersion that does not comprise a steviol glycoside through a process comprising
dissolving a sorbate salt in water to form a sorbate solution;
adding a stabilizing carrier to the sorbate solution to form a sorbate/carrier solution, wherein the stabilizing carrier is selected from the group consisting of oxygenated, hydrophilic salts of organic and inorganic acids, polysaccharides, and combinations thereof; wherein the stabilizing carrier and the sorbate salt are present in a weight ratio ranging from 0.1:10 to 10:0.1; and wherein the sorbate/carrier solution does not comprise a steviol glycoside; and
spray drying the sorbate/carrier solution to form the sorbate solid dispersion that does not comprise a steviol glycoside; and
combining:
water;
at least one ingredient selected from the group consisting of sweeteners and flavorants; and
the sorbate solid dispersion that does not comprise a steviol glycoside to form a beverage syrup.

2. The method of claim 1, wherein the sorbate salt is potassium sorbate.

3. The method of claim 1, wherein the stabilizing carrier is selected from the group consisting of sodium hexametaphosphate (SHMP), potassium dihydrogen phosphate, potassium citrate, sodium tartrate, maltodextrin, gum arabic, pectin, carrageenan, ghatti gum, starch, alginate, cellulose, modified starch, carboxyl methyl cellulose (CMC), and combinations thereof.

4. The method of claim 1, wherein the stabilizing carrier and the sorbate salt are present in a weight ratio ranging from 0.5:5 to 5:0.5.

5. The method of claim 1, wherein the sorbate solid dispersion that does not comprise a steviol glycoside comprises 20% to 80% by weight sorbate.

6. The method of claim 1, wherein beverage syrup comprises 1000 to 2300 ppm sorbate.

7. The method of claim 1, wherein the stabilizing carrier and sorbate are present in a weight ratio of about 1:1.

8. The method of claim 1, wherein preparing the sorbate solid dispersion that does not comprise a steviol glycoside consists essentially of:
dissolving the sorbate salt in water to form the sorbate solution;
adding the stabilizing carrier to the sorbate solution to form the sorbate/carrier solution, wherein the stabilizing carrier is selected from the group consisting of oxygenated, hydrophilic salts of organic and inorganic acids, polysaccharides, and combinations thereof; wherein the stabilizing carrier and the sorbate salt are present in a weight ratio ranging from 0.1:10 to 10:0.1; and
spray drying the sorbate/carrier solution to form the sorbate solid dispersion that does not comprise a steviol glycoside.

9. The method of claim 1, wherein preparing the sorbate solid dispersion that does not comprise a steviol glycoside consists of:
dissolving the sorbate salt in water to form the sorbate solution;
adding the stabilizing carrier to the sorbate solution to form the sorbate/carrier solution, wherein the stabilizing carrier is selected from the group consisting of oxygenated, hydrophilic salts of organic and inorganic acids, polysaccharides, and combinations thereof; wherein the stabilizing carrier and the sorbate salt are present in a weight ratio ranging from 0.1:10 to 10:0.1; and
spray drying the sorbate/carrier solution to form the sorbate solid dispersion that does not comprise a steviol glycoside.

* * * * *